C. A. MORRIS.
EXCAVATING SHOVEL.
APPLICATION FILED MAY 20, 1910.
1,139,559.
Patented May 18, 1915.
2 SHEETS—SHEET 2.
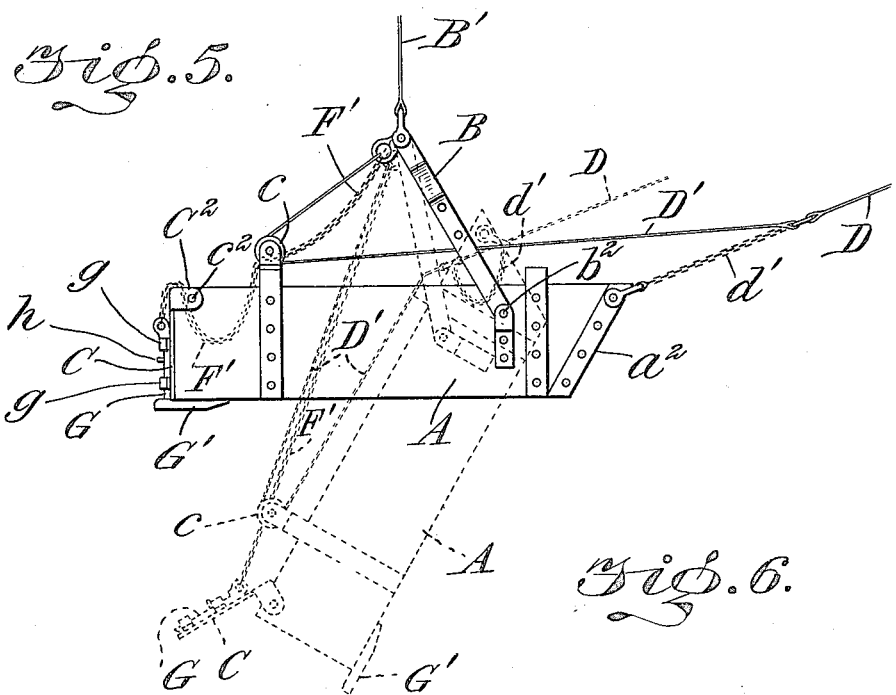
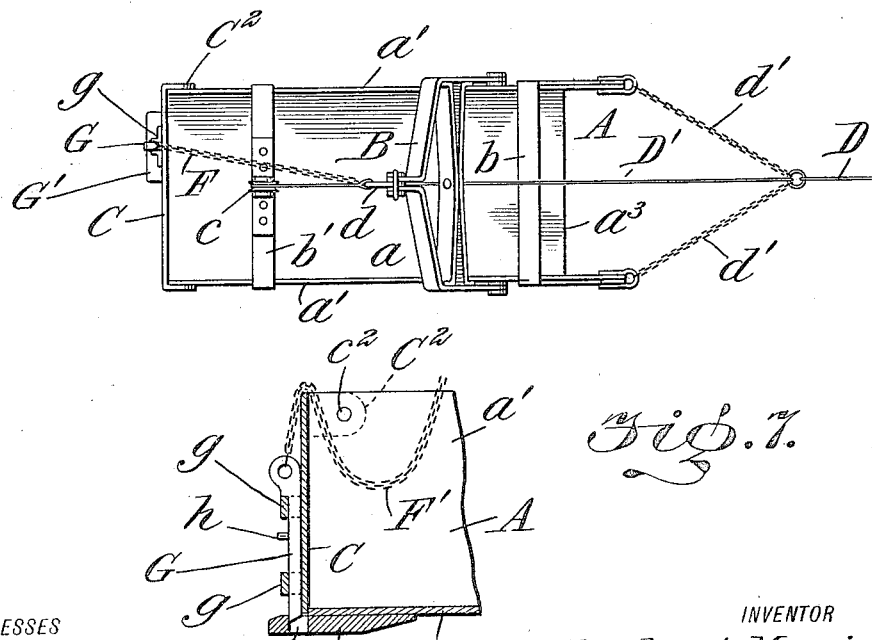
WITNESSES
A. C. Abbott
M. E. Freeman.
INVENTOR
Charles A. Morris
BY
Griffins Bernhard
ATTORNEYS

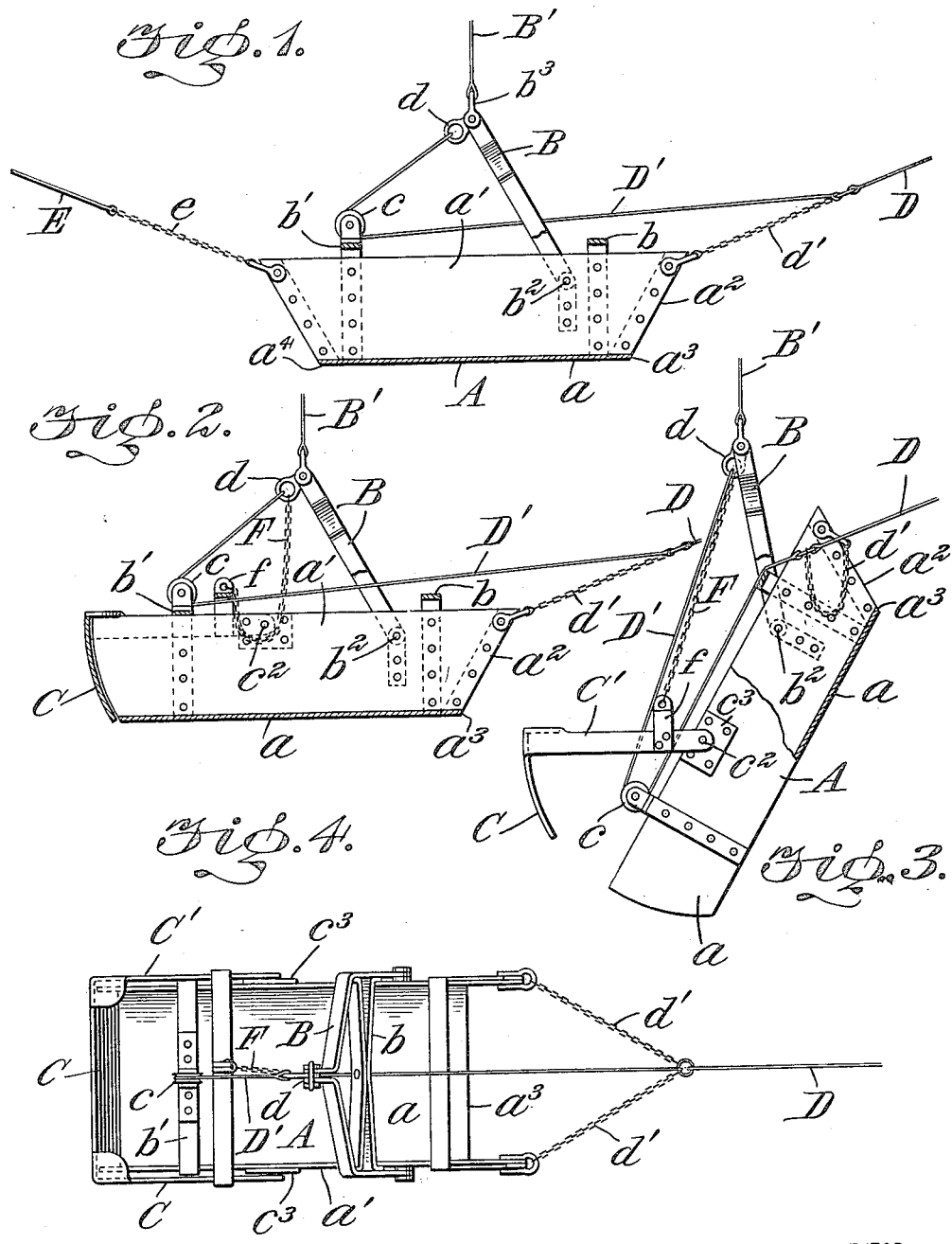

UNITED STATES PATENT OFFICE.

CHARLES A. MORRIS, OF MONTCLAIR, NEW JERSEY, ASSIGNOR TO THE HAYWARD COMPANY, A CORPORATION OF NEW YORK.

EXCAVATING-SHOVEL.

1,139,559.

Specification of Letters Patent. Patented May 18, 1915.

Application filed May 20, 1910. Serial No. 562,445.

*To all whom it may concern:*

Be it known that I, CHARLES A. MORRIS, a citizen of the United States, residing in Montclair, county of Essex, and State of New Jersey, have invented a certain new and useful Excavating-Shovel, of which the following is a specification.

This invention is an excavating shovel of simple and efficient construction, and involving a principle of operation distinctly novel in the art. The shovel is of that type wherein the loading is done at one end and the unloading at the other, and one important feature of the invention consists in providing a shovel of the type specified wherein the tail gate is operated independently of the suspending devices, which shovel is at all times under control, in contradistinction to those which operate under such conditions that the shovel is unsteady or sways.

Another important feature of the invention consists in providing the point of suspension intermediate the loading end of the shovel and the center of gravity of said shovel.

A further feature of the invention consists in a novel construction of tail gate which permits the same to be closed by gravity, and, preferably, without the intervention of mechanically actuated closing devices.

In the accompanying drawings I have illustrated different practical embodiments of the invention, but the constructions shown therein are to be understood as illustrative, only, and not as defining the limits of the invention.

Figure 1 is a vertical longitudinal section, partly in elevation, through a scraper shovel embodying my invention and adapted to be loaded at either end, and to be discharged at one end or the other. Fig. 2 is a vertical longitudinal section, partly in elevation, of a preferred form of my scraper shovel illustrating the same in the conveying position, the tail gate being closed. Fig. 3 is a view of the shovel shown in Fig. 2 in the dumping position, the tail gate being opened. Fig. 4 is a plan view of the shovel shown in Figs. 2 and 3. Figs. 5, 6, and 7 are views in side elevation, plan view and vertical section, respectively, the dotted lines in Fig. 5 illustrating the dumping position of the shovel.

The shovel, A, shown more particularly in Fig. 1, consists of a bottom, $a$, and parallel side walls, $a'$, said shovel being open at both ends. Preferably, the edges, $a^2$, at the ends of side walls, $a'$, are inclined upwardly and forwardly with respect to cutting edges, $a^3$, $a^4$, at the respective ends of bottom, $a$. As shown, the side walls of the shovel are connected by cross pieces, $b$, $b'$, which serve as stays to the sides of the shovel, and on cross pieces, $b'$, is journaled a direction sheave or pulley, $c$.

Suitable means are provided for suspending the shovel, and, as shown herein, I employ a bail, B, adapted to straddle the shovel and connected pivotally thereto by suitable pins, bolts or studs, $b^2$. The bail is shown as having a clevis or eye, $b^3$, to which is connected a suspending member, such as a cable, B'. Furthermore, the suspending bail is shown as having an eye, $d$, the purpose of which will presently appear.

D is a haul cable or line connected by a bail, or by chains, $d'$, to one end portion of the shovel. Said cable, D, is connected to what I will hereinafter refer to as the front end of shovel, A, the other end of the shovel being referred to as the rear thereof.

An auxiliary cable or chain, D', is employed for retaining the shovel in a substantially horizontal position during the operations of hoisting and conveying the load. Said auxiliary cable coöperates with the pulley or sheave, $c$, so that it has a running connection with the shovel. One end of cable, D', is attached to haul cable or line, D, but the other end of said cable, D', is attached to eye, $d$, of suspending bail, B.

For certain purposes I employ another haul cable, E, shown in Fig. 1, which cable is connected by a bail, or by chains, $e$, to the rear of shovel, A, whereby the shovel may be drawn in an opposite direction to that in which it is adapted to be drawn by cable, D. The haul cable, E, and its bail or chains, $e$, are not essential parts of the invention, and it is manifest that said cable and its bail or chains may be omitted.

Assuming that the shovel is to be loaded by hauling it along the ground by the action of cable, D, it is desired to call attention to the fact that the pivotal connection of bail, B, to the shovel is at a point intermediate the loading end of said shovel and the center of gravity of said shovel. According to this invention, it is essential that tension be placed on the haul cable, D, and auxiliary cable, D', at all times during the operations of hoisting and conveying the shovel and its load, but when the shovel is performing the functions of scraping the earth so as to load the shovel, it is not essential that tension be kept on the auxiliary cable, D', or the suspension bail and cable, B, B', respectively. By keeping tension upon cables, D, D', control of the shovel during the hoisting and conveying operation is secured for the purpose, mainly, of precluding undue movement or swaying of the shovel and its load when suspended from a boom, cableway, or other aerial track.

The operation of the shovel shown in Fig. 1 will be manifest from the preceding description, but it may be summarized as follows: For the purpose of scraping the earth and loading the excised material into the shovel, it is lowered into contact with the ground, and the cable, D, is drawn in one direction by the operation of winding said cable upon a suitable spool or drum, the cables, B', D', and bail, B, being slack. The front edge, $a^3$, of the shovel cuts through the soil and the shovel is thus loaded. At a proper time cable, B', is operated for the purpose of lifting the shovel and its load, but at this time it is necessary to maintain tension on cables, D, D', whereby the cable, D', operates to keep the shovel in a horizontal or non-dumping position. The shovel and its load having been elevated the desired distance above the ground, said shovel and the devices are conveyed by suitable mechanism to the spoil bank or other place of deposit, tension being kept on cables, D, D', to preclude dumping of the shovel during the conveying operation. When the shovel reaches the place where the material is to be deposited, it is only necessary to slacken the haul cable, D, whereupon the shovel will swing downwardly and rearwardly on the pivots, $b^2$, thus dumping the shovel or discharging the load from the opposite end of said shovel to that in which the material entered the shovel; i. e., the shovel is loaded at one end and dumped or discharged at the other end. This is due to the fact that the pivotal connection, $b^2$, of bail, B, with the shovel is at a point intermediate the front loading end, $a^3$, and the center of gravity of the shovel.

Should it be desired to load the shovel at the other end, $a^4$, thereof, it is drawn in an opposite direction by cable, E, whereupon the other end edge, $a^4$, of the shovel cuts into the material, and said material is loaded upon the bottom and between the sides of the shovel. When the shovel is hoisted, after having been loaded at its rear end, it is necessary to keep tension on cables, D, D', for the purpose of maintaining the shovel in a carrying position, and this tension is kept on said cables, D, D', irrespective of the direction in which the shovel and its load are conveyed. When the shovel reaches the place of deposit, tension is slackened on cables, D, D', and the shovel tilts or inclines to a dumping position, but assuming that the shovel was loaded at its rear end, $a^4$, by the operation of haul cable, E, then the shovel will be dumped or unloaded at the same end, $a^4$, by slackening the tension on cables, D, D', the haul cable, E, being slackened, also, during the dumping operation.

My preferred construction is illustrated in Figs. 2, 3, and 4 of the drawings, wherein the shovel consists of bottom, $a$, side walls, $a'$, inclined at their front edges, as at $a^2$, and stays, $b$, $b'$, the latter stay, $b'$, having the direction sheave or pulley, $c$. The bottom is provided at its front edge with a cutting edge, $a^3$, but in this form of the invention it is not necessary to provide a cutting edge at the rear of the bottom corresponding to edge, $a^4$, in the construction of Fig. 1.

The rear of the shovel is closed by a tail gate, C, and to the front of the shovel is connected haul cable, D, by means of a bail or by chains, $d'$. A suspension cable, or equivalent device, B', is connected by a bail, B, to the shovel, and said bail has a pivotal connection, $b^2$, with the shovel at a point intermediate the loading end, $a^3$, and the center of gravity of the shovel. In all substantial respects, except the tail gate and its operating devices, the shovel of Figs. 2, 3, and 4 is similar to that of Fig. 1, although the rear cutting edge of the shovel in Fig. 1 is not embodied in the construction of shovel in Figs. 2, 3, and 4. It will be understood, therefore, that in addition to the haul cable, D, and the suspension bail, B, the shovel is equipped with the auxiliary cable, D', which runs beneath sheave, $c$, and is attached at one end to cable, D, and at its other end to eye, $d$, of bail, B, for the purpose of keeping the shovel in a horizontal position when tension is placed on the haul cable.

A characteristic feature of the tail gate employed in the shovel of Figs. 2, 3, and 4 consists in so connecting it to the shovel that said gate closes by gravity and independently of the operating devices associated with the shovel. As shown, the tail gate is fastened to fit snugly to the rear edges of side walls, $a'$, and bottom, $a$, of the shovel when said tail gate is closed, and said tail gate is shown as having arms, C', at it respective ends, said arms extending forwardly of the tail gate so as to lie alongside the side walls, $a'$. The forward ends of arms, C', are pivoted by pins or bolts, $c^2$, to face plates, $c^3$, fastened to the outer surfaces of walls, $a'$, of the shovel, said pivotal connections, $c^2$, being positioned, preferably, at or near the top edge of the shovel. The gate and its arms are of sufficient weight to drop by gravity across the rear open end of the shovel, but when the shovel tilts to the inclined position shown in Fig. 3, for the purpose of discharging the load at the rear end of said shovel, the tail gate is raised by the resistance afforded by chains, cables or other flexible connections, F.

Arms, C', of the tail gate are shown as having lugs, $f$, to which the chains or cables, F, are fastened, the other ends of said chains or cables being attached to the eye, $d$, of the suspending bail. The chains or cables, F, are shorter than that length of cable, D', between eye, $d$, and sheave, $c$, when the shovel is in the inclined dumping position of Fig. 3, and thus the chains or cables, F, are adapted to pull upon the arms, C', and raise tail gate, C, to the position of Fig. 3 when the shovel tilts to the inclined dumping position shown in said figure.

The operation of the scraper shown in Figs. 2, 3, and 4 is as follows: To load the shovel, it is dropped upon the ground, cables, B', D', and bail, B, being slack, and tail gate, C, closing by gravity at the rear of the shovel. Tension is placed upon cable, D, and the shovel is drawn forwardly for the edge, $a^3$, to cut into the soil and load the shovel. The loaded shovel is elevated by the operation of cable, B', and bail, B, and tension being kept on cable, D, the auxiliary cable, D', operates to retain the shovel in a horizontal position. When the shovel is conveyed in one direction or the other, the gate, C, occupies the closed position, and tension is kept on cables, D, D', until the loaded shovel reaches the place where the material is to be discharged. To unload the shovel, tension is relaxed on cables, D, D', and the weight of the load causes pulley, $c$, to act on cable, D', for the shovel to assume the inclined position shown in Fig. 3. At this time, the cables, F, pull upon arms, C', and preclude the tail gate from dropping with the shovel, whereby the tail gate is opened automatically and the shovel is free to assume the inclined position for the purpose of discharging the load at the rear end thereof. The shovel may now be carried back to the field of operation and lowered upon the ground, at which time the tail gate closes the rear end of the shovel, and the haul cable, D, may now be operated for the purpose of again loading the shovel.

The shovel of Figs. 5, 6, and 7 is similar in structure to the shovel of Figs. 2, 3, and 4, but with the addition of means for locking the shovel in a closed position. The tail gate, C, is shown as having short forwardly extending arms, C², which are pivoted by bolts, pins or studs, $c^2$, to the sides of the shovel, preferably near the upper edge thereof, whereby the tail gate is adapted to close itself by gravity at the rear of the shovel. Said tail gate is provided with guides, $g$, in which is confined a sliding bolt, G. To the bottom, $a$, of the shovel is attached a plate, G', extending rearwardly beyond said bottom, and provided with an opening, $g'$, adapted to receive the lower bevel end of latch, G, whereby the plate, G', operates as a keeper for the latch. The latch is connected at its upper end to a cable or chain, F', the other end of which is attached to eye, $d$, of the suspending bail. Latch, G, is shown as having a stop lug, $h$, located at a point intermediate the guides, $g$, and when the latch is pulled in an upward direction so as to release it from the keeper, G', the stop lug, $h$, is adapted to engage with the upper guide, $g$, and thus pull upon the gate, C, for the purpose of opening the gate after said latch shall have been disengaged from its keeper.

The operation of the shovel having a latch for locking the tail gate in a closed position is similar to the operation of the shovel shown in Figs. 2, 3, and 4. The shovel of Figs. 5, 6, and 7 has its rear delivery end closed by the tail gate when said shovel is being loaded, hoisted and conveyed, said tail gate being securely fastened by the action of the latch. When the loaded shovel reaches the place where the load is to be discharged, tension on the cables, D, D', is slackened and the shovel swings downwardly. Upon the downward movement of the rear part of the shovel, the chain, F', pulls on bolt, G, to withdraw it from keeper, G', and this pull is exerted through lug, $h$, upon the tail gate for the purpose of swinging the tail gate upwardly when the shovel drops downwardly to assume the inclined position wherein the load is discharged from the rear end of the shovel.

Having thus fully described the invention, what I claim as new, and desire to secure by Letters Patent is:

1. An excavating shovel adapted to be loaded at one end and discharged at the opposite end, and having its point of suspension positioned intermediate the loading end and the center of gravity of said shovel, said shovel being provided with a gravity closing tail gate, means for locking the tail gate in its closed position, and mechanically actuated means operated by the tilting movement of the shovel for unlocking and for opening the tail gate.

2. An excavating shovel adapted to be loaded at one end and discharged at the other end, suspending mechanism connected to the shovel intermediate the loading end and the center of gravity of said shovel, a haul cable held under tension during the operations of loading and conveying the shovel, means connected with the haul cable and coöperating with the shovel for precluding said shovel from dumping when the haul cable is under tension, a tail gate pivoted to close by gravity, and a gate-operating cable connected to the suspending mechanism and to the tail gate, said gate-operating cable being operable upon the inclination of the shovel to a dumping position for opening said tail gate.

3. In an excavating apparatus, the combination of a shovel adapted to be loaded at one end and to be discharged at the opposite end, a suspending bail pivoted to said shovel intermediate its loading end and the center of gravity of said shovel, a haul line, a tail-gate pivoted to the shovel, the pivotal connection between said tail-gate and the shovel being independent of the pivotal connection between the suspending bail and the shovel and the weight of said tail-gate being carried by the shovel in the operation of loading the latter by the action of the haul line, a dump-controlling member operated by tension on the haul line for retaining the shovel in a non-dumping relation to the suspending bail, and means for supporting the tail-gate upon the dumping movement of the shovel.

4. In an excavating apparatus, the combination of a shovel adapted to be loaded at one end and to be discharged at the opposite end, a suspending member having pivotal connection with the shovel intermediate the loading end and the center of gravity thereof, a haul line, a tail-gate coöperating with the discharging end of said shovel and supported directly by the shovel and independently of the suspending member when said shovel is being loaded under the pull of the haul line, said tail-gate having a separate pivotal connection with the shovel rearwardly of the pivotal connection between the shovel and the suspending member, a dump controlling member attached at its respective ends to the suspending member and to the haul line, said dump-controlling member having a running connection with the shovel, and a flexible gate lifting member attached to the tail-gate and the suspending member for supporting said tail-gate in a raised position when the shovel is turned to assume a dumping position.

5. In an excavating apparatus, the combination of a shovel adapted to be loaded at one end and discharged at the opposite end, a suspending member connected to said shovel intermediate the loading end and the center of gravity thereof, a tail-gate supported directly by the shovel for closing the discharging end thereof when said shovel is being loaded by the action of the haul line, said tail-gate being pivoted to the shovel independent of the connection of the suspending member thereto, a haul line, a dump controlling member attached at its respective ends to the suspending member and the haul line, said dump-controlling member having running engagement with the shovel rearwardly of the connection thereto of the suspending member, and a flexible member attached to the suspending member and operating to support the tail-gate in a raised position when the shovel turns into a dumping position by slackening the haul line and the dump-controlling member.

In testimony whereof I have signed my name to this specification in the presence of two subscribing witnesses.

CHARLES A. MORRIS.

Witnesses:
H. I. BERNHARD,
JAS. H. GRIFFIN.

Copies of this patent may be obtained for five cents each, by addressing the "Commissioner of Patents, Washington, D. C."